US011681381B2

United States Patent
Marwah et al.

(10) Patent No.: US 11,681,381 B2
(45) Date of Patent: Jun. 20, 2023

(54) ACTIVE STYLUS WITH MOVEABLE MAGNET

(71) Applicant: Microsoft Technology Licensing, LLC, Redmond, WA (US)

(72) Inventors: Rahul R. Marwah, Issaquah, WA (US); Bradley Edgar Clements, Fort Collins, CO (US); Brady James Toothaker, Longmont, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/227,092

(22) Filed: Apr. 9, 2021

(65) Prior Publication Data

US 2022/0326789 A1   Oct. 13, 2022

(51) Int. Cl.
*G06F 3/0354* (2013.01)
*H02J 50/90* (2016.01)
*H02J 50/10* (2016.01)
*G06F 3/01* (2006.01)

(52) U.S. Cl.
CPC .......... *G06F 3/03545* (2013.01); *G06F 3/016* (2013.01); *H02J 50/10* (2016.02); *H02J 50/90* (2016.02)

(58) Field of Classification Search
CPC ...... G06F 3/03545; G06F 3/016; H02J 50/10; H02J 50/90; H01F 38/14
See application file for complete search history.

(56) References Cited

U.S. PATENT DOCUMENTS

| 3,915,015 | A | 10/1975 | Crane et al. |
| 4,905,007 | A | 2/1990 | Rohm |
| 5,981,883 | A | 11/1999 | Shriver |
| 8,487,873 | B2 | 7/2013 | Rosenberg |
| 10,236,710 | B1* | 3/2019 | de la Fuente ....... G06F 3/03545 |
| 10,296,089 | B2 | 5/2019 | Peretz et al. |
| 10,936,092 | B1 | 3/2021 | Baugh et al. |
| 10,936,992 | B1 | 3/2021 | Rusnak et al. |
| 11,379,058 | B1 | 7/2022 | Clements et al. |
| 2009/0135164 | A1* | 5/2009 | Kyung ................... G06F 3/016 345/173 |

(Continued)

FOREIGN PATENT DOCUMENTS

| CN | 107785975 A | 3/2018 |
| JP | 2016192236 A | 11/2016 |

OTHER PUBLICATIONS

"International Search Report and Written Opinion Issued in PCT Application No. PCT/US22/021071", dated Jun. 20, 2022, 10 Pages.

(Continued)

*Primary Examiner* — Temesghen Ghebretinsae
*Assistant Examiner* — Ivelisse Martinez Quiles
(74) *Attorney, Agent, or Firm* — Alleman Hall Creasman & Tuttle LLP

(57) ABSTRACT

An active stylus includes an elongate housing having a tip end and a secondary end, opposite the tip end. An inductive charging coil is mounted within the elongate housing, between the tip end and the secondary end. A magnet configured to magnetically hold the inductive charging coil in a charging position and orientation relative to an inductive charger is moveably mounted within the elongate housing between the tip end and the inductive charging coil.

17 Claims, 5 Drawing Sheets

(56) References Cited

U.S. PATENT DOCUMENTS

| | | |
|---|---|---|
| 2013/0321358 A1* | 12/2013 | Park .................. G06F 3/03545 |
| | | 345/179 |
| 2014/0028592 A1 | 1/2014 | Wang et al. |
| 2014/0285453 A1 | 9/2014 | Park et al. |
| 2017/0285774 A1 | 10/2017 | Parikh et al. |
| 2018/0059817 A1 | 3/2018 | Pirie et al. |
| 2018/0224954 A1 | 8/2018 | Chiang et al. |
| 2018/0260048 A1 | 9/2018 | Chang |
| 2018/0329527 A1 | 11/2018 | Park et al. |
| 2019/0064936 A1 | 2/2019 | Wang |
| 2020/0089340 A1 | 3/2020 | Ruscher et al. |
| 2020/0328614 A1* | 10/2020 | Jackson ................ H01F 38/14 |
| 2020/0371608 A1 | 11/2020 | Thomas, III et al. |
| 2021/0004113 A1 | 1/2021 | Autio et al. |
| 2021/0026450 A1 | 1/2021 | Fu et al. |
| 2022/0334659 A1 | 10/2022 | Clements et al. |

OTHER PUBLICATIONS

"Notice of Allowance Issued in U.S. Appl. No. 17/232,038", dated Feb. 25, 2022, 9 Pages.
"International Search Report and Written Opinion Issued in PCT Application No. PCT/US22/020096", dated May 20, 2022, 13 Pages.
U.S. Appl. No. 17/806,441, filed Jun. 10, 2022.
U.S. Appl. No. 17/232,038, filed Apr. 15, 2021.
"Non Final Office Action Issued in U.S. Appl. No. 17/806,441", dated Sep. 7, 2022, 14 Pages.
"Non Final Office Action Issued in U.S. Appl. No. 17/806,441", dated Jan. 9, 2023, 10 Pages.

* cited by examiner

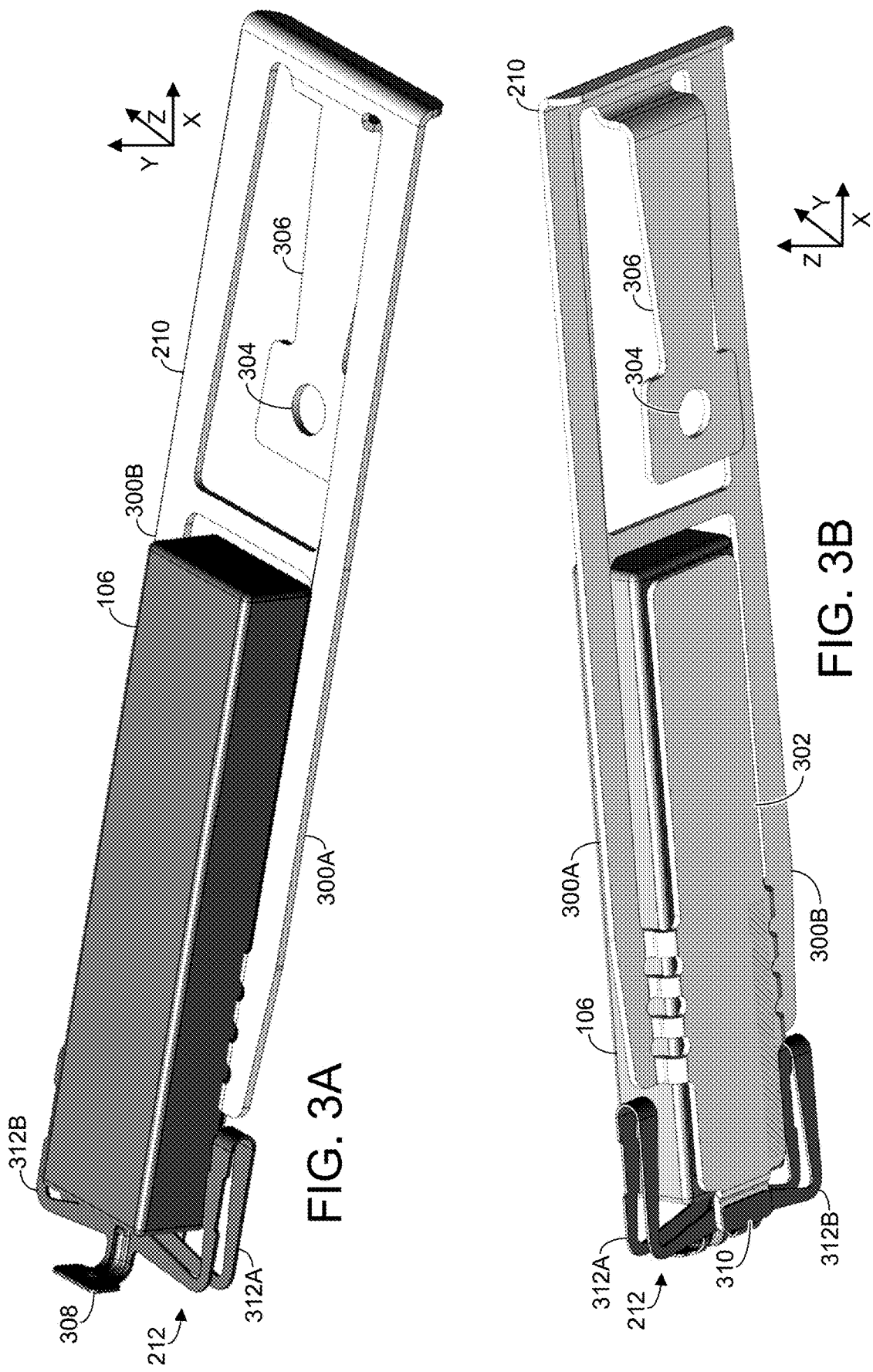

ACTIVE STYLUS WITH MOVEABLE MAGNET

BACKGROUND

Some electronic devices include haptic motors configured to provide haptic feedback. A haptic motor may cause the electronic device to vibrate and thereby provide a tactile sensation to a user—e.g., in response to a button press or software input.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

An active stylus includes an elongate housing having a tip end and a secondary end, opposite the tip end. An inductive charging coil is mounted within the elongate housing, between the tip end and the secondary end. A magnet configured to magnetically hold the inductive charging coil in a charging position and orientation relative to an inductive charger is moveably mounted within the elongate housing between the tip end and the inductive charging coil.

BRIEF DESCRIPTION OF THE DRAWINGS

FIGS. 3A and 3B show different views of select components of the example active stylus of FIG. 2.

DETAILED DESCRIPTION

It may be desirable for an active stylus to be removably attachable to a separate device—e.g., for storage and/or charging. For example, an active stylus may include one or more magnets allowing the stylus to magnetically attach to a separate device, such as a computing device (e.g., a laptop or tablet) or a dedicated charging device. However, magnetic fields originating from such attachment magnets can interfere with the operation of a haptic motor disposed within the active stylus.

Accordingly, the present disclosure is directed to a design for an active stylus that incorporates a magnet that is moveably mounted within a housing of the active stylus. The magnet may be useable for magnetically attaching the active stylus to a separate device, such as a computing device or charger. In some examples, the moveable magnet may be a dual-purpose magnet, useable both for magnetically attaching the active stylus to a separate device, as well as providing haptic feedback. For example, the moveable magnet may be a haptic magnet that is mounted within a haptic motor coil inside an elongate housing of the active stylus. Thus, the haptic magnet may be driven by the haptic motor coil to provide haptic feedback (e.g., as part of a linear resonant actuator), while also being useable to magnetically hold the active stylus against a separate device—e.g., for the purpose of inductive charging.

Figure 1:
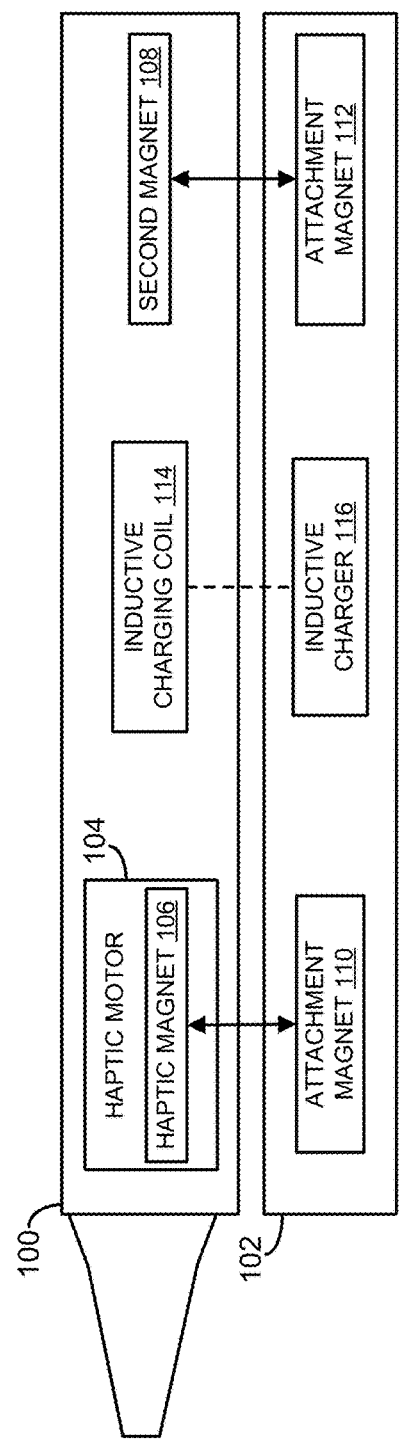
FIG. 1 schematically depicts an example active stylus and a charging device.

This is schematically illustrated in FIG. 1, showing an example active stylus 100 magnetically attached to a charging device 102. Although FIG. 1 depicts a small gap between the active stylus and charging device, it will be understood that this is only for the sake of visual clarity, and that the active stylus and charging device may make physical contact in practical implementations. Furthermore, both active stylus 100 and charging device 102 are non-limiting examples, and may take any suitable form. In particular, though the configurations described herein are described with respect to an active stylus, it will be understood that dual-purpose attachment and haptic magnets may be used with other types of electronic devices, and need not exclusively be limited to active styluses.

Furthermore, in this example, the active stylus is affixed to a device configured to charge the active stylus. For example, charging device 102 may take the form of a dedicated charger for the active stylus, a computing device (e.g., laptop or tablet) that includes suitable charging hardware, or another suitable charging device. It will be understood, however, that this need not be the case. Rather, an active stylus as described herein may be configured to magnetically attach to any device having a suitable configuration of magnets, regardless of whether such a device is also configured to charge the active stylus.

In FIG. 1, active stylus 100 includes a haptic motor 104 configured to provide haptic feedback during operation of the active stylus. Haptic motor 104 includes a haptic magnet 106. As will be described in more detail below, haptic magnet 106 may be moveably mounted within a haptic motor coil, such that the haptic magnet is configured to be driven by the haptic motor coil to cause movement of the magnet. Movement of the magnet may, in turn, cause haptic feedback in the form of vibration of the active stylus. In some cases, the haptic magnet may beneficially be disposed proximate to a location at which a user grips the active stylus. In this manner, force caused by movement of the haptic magnet may be more directly transferred to the user's hand, improving the tactile sensation provided by the haptic feedback.

Haptic feedback may be provided at any suitable time and in response to any suitable stimuli. Furthermore, the haptic feedback may have any suitable properties—e.g., intensity, duration, pulse frequency—and such properties may change depending on the implementation and depending on the type of stimulus that the haptic feedback is provided in response to.

Active stylus 100 further includes a second magnet 108. Haptic magnet 106 and second magnet 108 are configured to interact with a first attachment magnet 110 and a second attachment magnet 112 of the charging device to magnetically hold the active stylus against the charging device, as is shown in FIG. 1. Specifically, haptic magnet 106 and second magnet 108 may be configured to hold the active stylus in a charging position and orientation relative to the charging device, thereby enabling the charging device to electronically charge an on-board battery of the active stylus.

The various magnets described herein may each be constructed from any suitable ferromagnetic materials. As non-limiting examples, the magnets described herein may be constructed partially or entirely from iron, cobalt, nickel, neodymium, and/or samarium.

In the example of FIG. 1, charging is achieved via an inductive charging coil 114 of the active stylus being brought into proximity with an inductive charger 116 of the charging device. In other examples, however, other suitable charging technologies may be used. For example, the active stylus may be charged with another suitable wireless charging technology, or the active stylus and charging device may include physical connectors that, when mated, enable charging of the active stylus.

It will be understood that the specific arrangement of magnets depicted in FIG. 1 is simplified and non-limiting. In general, while the active stylus will include at least one magnet that is moveably mounted and useable for attaching the active stylus to a charging device, the active stylus may include any number of other attachment magnets, which may be mounted statically or moveably within the active stylus. Furthermore, the active stylus may be configured to attach to any electronic device having a suitable complementary configuration of magnets—e.g., one or more magnets with a suitable position and polarity as to magnetically attract the magnets within the active stylus, thereby holding the active stylus in place.

Figure 2A:
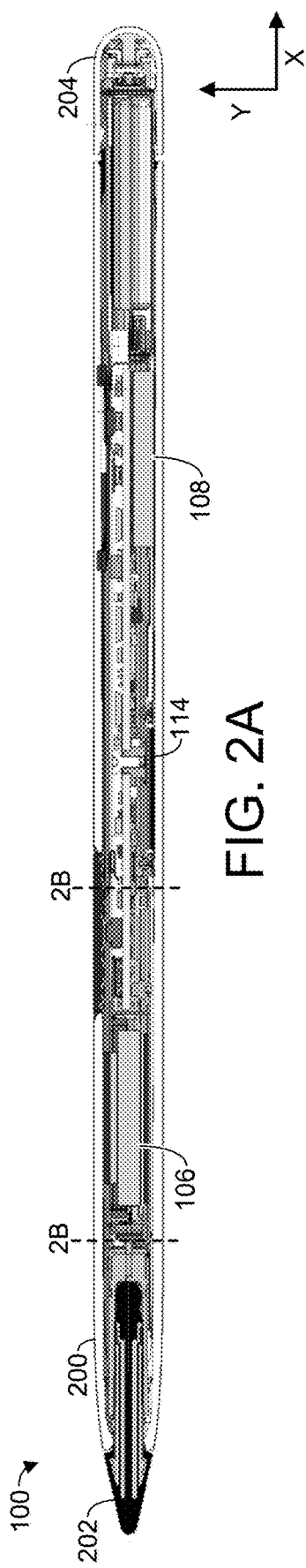
FIGS. 2A and 2B show components of an example active stylus in cross section.
Figure 4:
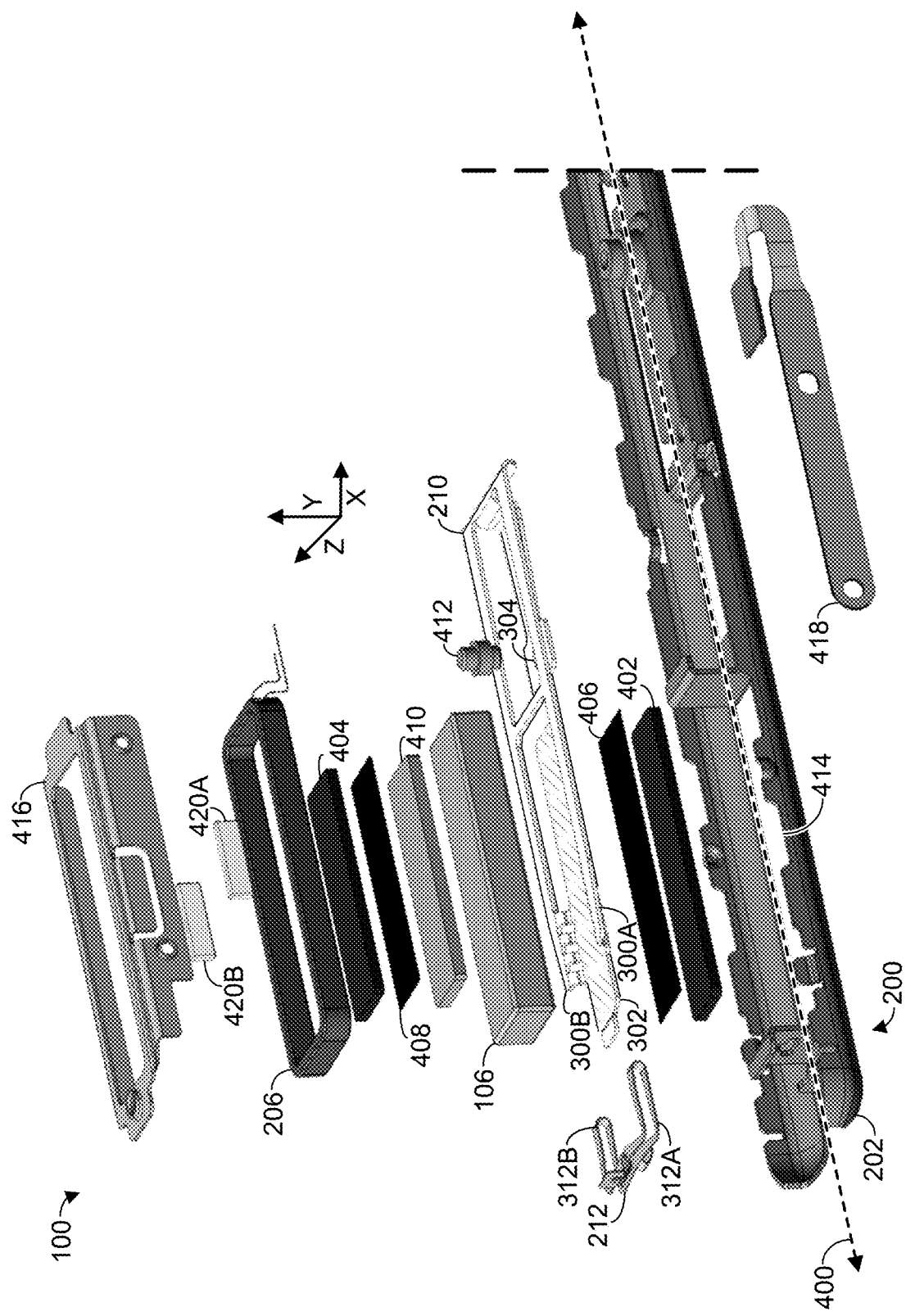
FIG. 4 shows an exploded view of some components of the example active stylus of FIG. 2.
Figure 5:
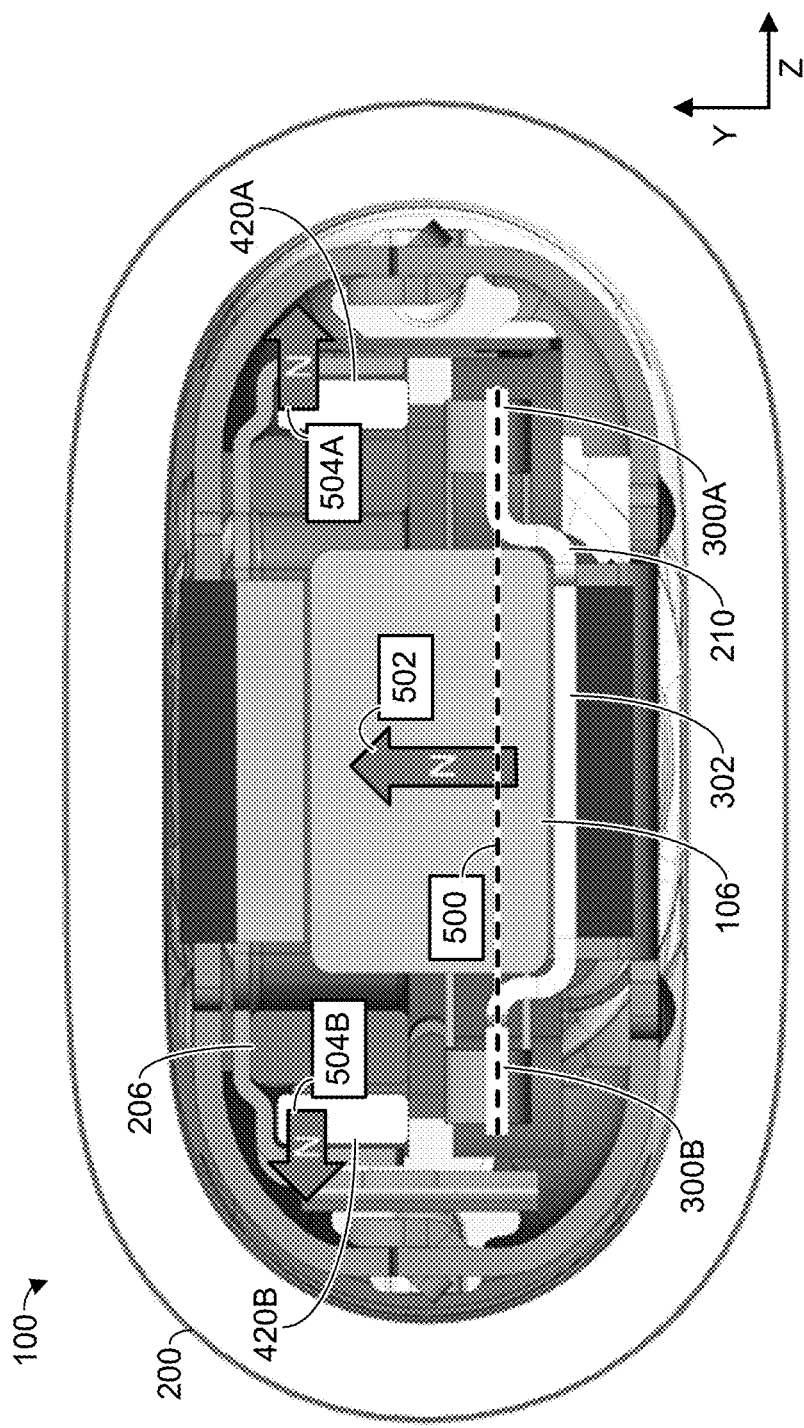
FIG. 5 shows another cross-sectional view of the example active stylus of FIG. 2.

FIG. 2A depicts a cross-sectional view of active stylus 100 in more detail, where the stylus is sectioned along an XY plane, orthogonal to a Z axis that extends into the page. It will be understood that the specific configuration depicted in FIGS. 2A and 2B, as well as FIGS. 3-5, is a non-limiting example. An active stylus as described herein may have any suitable size, shape, dimensions, and arrangement of components. In other examples, an active stylus may omit one or more of the components described herein, and/or include one or more additional or alternative components to the ones described herein.

In the example of FIG. 2A, active stylus 100 includes an elongate housing 200 having a tip end 202 and a secondary end 204, opposite the tip end. The housing has an elongate shape because it is longer along one axis (e.g., the X axis) as compared to a second, orthogonal axis (e.g., the Y axis). A length of the stylus along the third orthogonal axis (e.g., the Z axis extending into the page) may similarly be less than the length along the X axis. A different cross section of active stylus 100, sectioned along the YZ plane, will be described below with respect to FIG. 5.

While active stylus 100 includes a tip end 202 and a secondary end 204 that has a different shape and appearance from tip end 202, it will be understood that this is non-limiting. In other examples, an active stylus may have two ends having substantially similar shapes and appearances. Similarly, an active stylus may have one or more ends that do not resemble those depicted in FIG. 2A.

The elongate housing may be constructed from any suitable materials, including a mix of multiple different materials. As non-limiting examples, the elongate housing may be constructed partially or entirely from suitable plastics, rubbers, metals, glasses, ceramics, and/or plant fibers (e.g., wood).

Haptic magnet 106, second magnet 108, and inductive charging coil 114 are also depicted within FIG. 2A. Specifically, as shown, inductive charging coil 114 is statically mounted within the elongate housing of the active stylus, between tip end 202 and secondary end 204. As discussed above, inductive charging coil 114 may be useable to electronically charge a battery of the active stylus when positioned in proximity to an inductive charger of a separate charging device. Second magnet 108 is statically mounted within the elongate housing between the secondary end and the inductive charging coil. It may generally be desirable to position the inductive charging coil between the haptic magnet and second magnet, to increase the distance between the charging coil and each magnet, and thereby mitigate magnetic interference during inductive charging. In some embodiments, the inductive charging coil may be substantially centered between the haptic magnet and the second magnet.

Figure 2B:
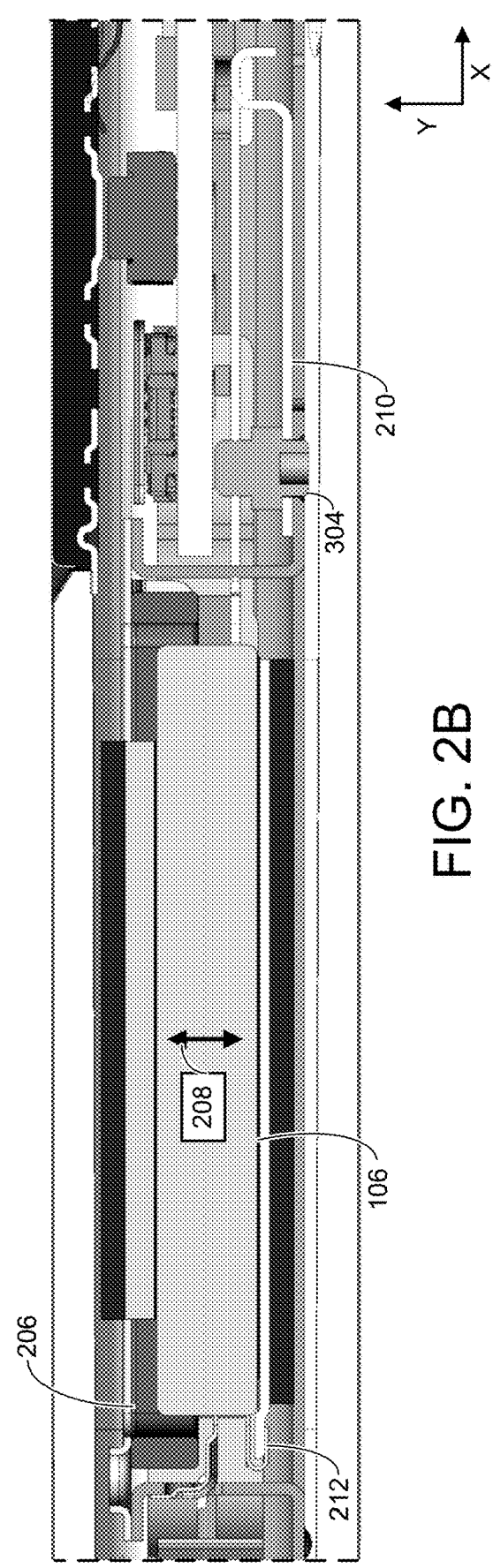

FIG. 2B shows a zoomed-in view of a portion of the cross-section depicted in FIG. 2A, focusing on haptic magnet 106. As shown, active stylus 100 includes a haptic motor coil 206 statically mounted within the elongate housing, between tip end 202 and secondary end 204. The haptic motor coil may be constructed from any suitable electrically conductive metals. Haptic magnet 106 is moveably mounted within the elongate housing, such that at least a portion of the haptic magnet is disposed within the haptic motor coil. As a result of this configuration, when an electric current passes through haptic motor coil 206, the interaction between the resulting electromagnetic field and the haptic magnet 106 produces a magnetic force perpendicular to the plane of the haptic motor coil. In other words, the magnetic force is parallel to a travel axis 208 of the haptic magnet (e.g., parallel to the "Y" axis) along which the magnet moves during haptic feedback. Thus, the haptic magnet is configured to be driven by the haptic motor coil to provide haptic feedback.

Furthermore, as discussed above, haptic magnet 106 may be configured to magnetically hold the active stylus against a separate device, such as a charging device. For example, the haptic magnet may be configured to magnetically hold inductive charging coil 114 in a charging position and orientation relative to a separate inductive charger. Similarly, second magnet 108 may be configured to cooperate with the haptic magnet to magnetically hold the inductive charging coil in the charging position and orientation relative to the inductive charger. As discussed above, however, an active stylus as described herein may include any suitable number and arrangement of statically-mounted and moveably-mounted magnets. Furthermore, an active stylus may include one or more magnets that are moveably mounted within an elongate housing and useable for magnetically attaching the active stylus to a separate device, without such magnets being integrated into a haptic motor or used to provide haptic feedback.

In any case, the moveably-mounted magnet may in some cases be spring mounted within the elongate housing by a first spring affixed to the haptic magnet and the elongate housing, where the first spring enables movement of the haptic magnet relative to the elongate housing. As the mass of the haptic motor moves within the housing, a haptic sensation may be felt by a user holding the stylus. A portion of a first spring 210 is shown in FIG. 2B. First spring 210 may enable movement of haptic magnet 106 during haptic feedback along travel axis 208.

In some cases, the haptic spring may be further spring mounted to the elongate housing by a second spring affixed to the elongate housing and a tip-proximal end of the haptic magnet. This is also shown in FIG. 2B, in which a second spring 212 is visible. The first and second springs may enable movement of the haptic magnet relative to the elongate housing along the haptic travel axis during haptic feedback. Thus, as discussed above, the haptic magnet may be driven by the haptic motor coil, thereby causing movement of the haptic magnet in a direction parallel to travel axis 208, where such movement is facilitated by flexion and extension of first spring 210 and second spring 212.

In some examples, a magnetic force associated with driving the haptic motor coil may be sufficient to overcome a spring force provided by the first and/or second springs, thereby causing movement of the haptic magnet along the travel axis. However, when the haptic motor coil is not driven, the spring force provided by the first and/or second springs may return the haptic magnet to, or past, a neutral position. By aligning activity of the haptic motor coil with a resonant frequency of the spring system, the overall intensity of the haptic feedback may be increased.

Each of the first spring and second spring may be constructed from any suitable material or combination of materials. As non-limiting examples, the first and/or second springs may be constructed from suitable plastics, metals, or metal alloys.

In some cases, while enabling movement of the haptic magnet along the travel axis, the first and second springs may be configured to mitigate other movements of the haptic magnet in other directions. In other words, the first and second springs may be configured to reduce or substantially prevent movement of the haptic magnet along the X axis, and reduce or substantially prevent movement of the haptic magnet along the Z axis extending into the page. Furthermore, the first and second springs may be configured to mitigate rotation of the haptic magnet.

By restricting movement of the haptic magnet to only intended directions (e.g., along the travel axis), the haptic feedback provided by the haptic magnet may be more precisely controlled. Furthermore, reducing movements of the haptic magnet in unintended directions can reduce wear and tear on internal components of the active stylus—e.g., caused by impacts of the active stylus with other objects, such as when the active stylus is dropped. In some cases, use of two springs may enable a greater degree of control over the possible range of movements of the haptic magnet as compared to use of only a single spring. It will be understood, however, that a haptic magnet may be spring-mounted within an active stylus using any suitable number of springs, including only one spring, or more than two springs.

Additional details regarding example shapes and structures for suitable first and second springs will now be given with respect to FIGS. 3A and 3B. Specifically, FIGS. 3A and 3B show closer views of first spring 210, second spring 212, and haptic magnet 106, isolated from other components of active stylus 100. As shown, first spring 210 includes two supporting arms 300A and 300B that extend along first and second lateral sides of the haptic magnet.

First spring 210 also includes a supporting shelf 302 that extends between the two supporting arms at a tip-proximal side of the first spring—in other words, the side of the first spring that is relatively closer to tip end 202 of active stylus 100, as opposed to secondary end 204. An inner surface of the supporting shelf is affixed to a shelf-attachment surface of the haptic magnet, where the "inner" surface of the supporting shelf faces toward an interior of the active stylus, and the "outer" surface faces away from the haptic magnet and toward an exterior of the active stylus. The haptic magnet may be affixed to supporting shelf 302 in any suitable way. As non-limiting examples, the haptic magnet may be welded to the supporting shelf, or adhered to the supporting shelf using a suitable adhesive, such as pressure-sensitive adhesive (PSA). The supporting shelf 302 rigidly connects the supporting arms 300A and 300B to one another, thus mechanically resisting twisting about the X axis. Furthermore, the supporting shelf 302 extends along a substantial length of the haptic magnet 106, thus mechanically resisting twisting about the Y axis.

In the example of FIGS. 3A and 3B, a relatively short section of the supporting shelf is attached to the two supporting arms via four attachment beams on each side. As such, the added structure from the shelf only influences a short section of the support arms. This may beneficially prevent the supporting shelf from significantly increasing the stiffness of the first spring, instead allowing the first spring to flex substantially independently from the supporting shelf. In other examples, however, the supporting shelf may be attached to the supporting arms (and/or other portions of the first spring) in any suitable way.

As discussed above, first spring 210 is affixed both to haptic magnet 106 and elongate housing 200. Thus, first spring 210 includes a mount 304 at which the first spring is affixed to the elongate housing. Specifically, mount 304 attaches to elongate housing 200 at a position between the haptic magnet and the inductive charging coil—this is depicted in FIG. 2B for reference. The first spring may be affixed to the elongate housing in any suitable way. In one example, the first spring may be affixed to the elongate housing via one or both of riveting and welding—e.g., a rivet may be inserted through the circular window of mount 304, while a portion of the first spring surrounding the mount may be welded to the elongate housing and/or rivet. In other examples, however, the first spring may be affixed to the elongate housing in other suitable ways—e.g., via a suitable adhesive.

Continuing with FIGS. 3A and 3B, mount 304 is disposed along a mounting beam 306 of the first spring that extends away from the two supporting arms and toward the haptic magnet, at a tip-distal end of the first spring. Because mounting beam 306 folds under a plane defined by the two supporting arms, mounting beam 306 serves to increase an overall length of the first spring, thereby increasing the potential flexion of the spring along the mounting beam and two supporting arms. For example, as discussed above, the haptic motor coil may drive the haptic magnet to cause movement of the haptic magnet, and such movement may be controlled and constrained by flexion of the first spring.

FIGS. 3A and 3B also show second spring 212. As shown, second spring 212 includes two attachment mounts—a first attachment mount 308 at which the second spring is affixable to the elongate housing, and a second attachment mount 310 at which the second spring is affixed to a portion of the first spring. In this example, the second attachment mount of the second spring is affixed to a tab extending away from supporting shelf 302 of first spring 210. In other examples, the second attachment mount of the second spring may affix directly to the haptic magnet, rather than to the supporting shelf of the first spring. Each of the attachment mounts may be attached to the elongate housing, first spring, and/or haptic magnet using any suitable attachment techniques. As non-limiting examples, welding, riveting, and/or adhesives may be used.

In any case, the second spring may cooperate with the first spring to control and constrain movements of the haptic magnet during haptic feedback. This may be achieved via first and second flexion wings 312A and 312B of the second spring. The first and second flexion wings extend between the first and second attachment mounts and are respectively disposed on first and second lateral sides of the haptic magnet. Specifically, as with supporting arm 300A, flexion wing 312A is disposed on a first lateral side of the haptic magnet, while flexion arm 312B is disposed on a second side of the haptic magnet along with supporting arm 300B. As with the mounting beam of the first spring, the first and second flexion wings of the second spring serve to increase an overall length of the second spring, and thereby allow for more flexion of the second spring.

Each of the first and second springs may have any suitable stiffness, which may contribute to a vibration frequency of the haptic magnet during haptic feedback. In some examples, either or both of the first spring and the second spring may be selectively tuned to achieve a desired stiffness, and thereby a desired vibration frequency for the haptic magnet. Such tuning may in some cases be done by selectively tapering one or both of the first spring and the second spring to achieve a desired stiffness function along the length of the spring, causing the first and/or second springs to have regions of relatively more stiffness and relatively less stiffness along the length of the spring(s).

The first and/or second springs may be tapered relative to one or both of the spring's width (e.g., relative to the Z axis) and depth (e.g., relative to the Y axis). Furthermore, the first and/or second springs may be tapered by any suitable amount at any point along the length of the first and/or second springs. In other words, any particular portion of the first spring and/or second spring may have any suitable dimensions relative to other portions of the same spring, enabling the spring to have different stiffness properties at different portions along its length.

FIG. 4 shows an exploded view of a collection of components of active stylus 100. Specifically, FIG. 4 shows part of a lower portion of elongate housing 200 in the vicinity of tip end 202, along with first spring 210, second spring 212, haptic magnet 106, haptic motor coil 206, and various additional components that will be described in more detail below.

In FIG. 4, first spring 210 is shown in relation to other components of the active stylus, including part of a lower portion of elongate housing 200. As shown, first and second supporting arms 300A and 300B extend substantially parallel to a longitudinal axis 400 of the elongate housing. As discussed above, when the inward surface of the supporting shelf is affixed to a shelf-attachment surface of the haptic magnet, the first and second supporting arms are disposed on first and second lateral sides of the haptic magnet.

Continuing with FIG. 4, active stylus 100 includes a dampening material 402 affixed to an outward surface of the supporting shelf—where the "outward" surface faces away from the haptic magnet and toward the exterior of the active stylus. The dampening material may serve to dampen the force associated with downwards movement of the haptic magnet (relative to the Y axis, in this example), thereby changing the tactile sensation provided during haptic feedback. Active stylus also includes a similar dampening material 404 disposed above haptic magnet, which may serve to dampen the force associated with upwards movement of the haptic magnet. The dampening materials may also serve to reduce noise caused by contact between the haptic magnet (and/or other moving components) and static elements within the active stylus, both during and outside of haptic feedback. Each of dampening materials 402 and 404 may be constructed from any suitable combination of materials. As non-limiting examples, dampening materials may include suitable foams, rubbers, and soft plastics.

Dampening materials 402 and 404 may be affixed in any suitable way. In the example of FIG. 4, dampening materials 402 and 404 are affixed using adhesives 406 and 408. In one example, these adhesives may take the form of PSA, although other suitable adhesives and/or non-adhesive based attachment techniques may additionally or alternatively be used.

FIG. 4 further depicts a weight 410 disposed above haptic magnet 106, opposite from the shelf attachment surface and first spring 210. Weight 410 may serve to further tune the properties (e.g., frequency and intensity) associated with the haptic feedback provided by haptic magnet 106 when driven by haptic motor coil 206. Weight 410 may have any suitable mass and may be constructed from any suitable combination of materials. As non-limiting examples, weight 410 may be constructed from a suitable metal or metal alloy, such as stainless steel or tungsten.

As described above, first spring 210 may be affixed to elongate housing 200 at mount 304. In the example of FIG. 4, such attachment is achieved via a rivet 412, although in other examples, additional or alternative attachment techniques may be used.

In some examples, movement of the haptic magnet may be entirely confined to the interior of the elongate housing of the active stylus. In other examples, however, at least a portion of the haptic magnet may travel outside the elongate housing during haptic feedback. This is the case in FIG. 4, where elongate housing 200 defines a window 414 that enables travel of at least a portion of the haptic magnet outside the elongate housing during haptic feedback. This may allow for greater total travel of the haptic magnet, which may allow for a greater intensity of haptic feedback.

As described above, the haptic motor coil is statically mounted within the elongate housing of the active stylus. In the example of FIG. 4, this is achieved via a haptic motor coil mount 416, to which the haptic motor coil may be attached. In turn, haptic motor coil mount 416 may be affixed to an upper portion of the elongate stylus (not shown). Each of these attachments may use any suitable attachment techniques. As non-limiting examples, riveting, welding, and/or adhesives may be used.

FIG. 4 also depicts a flexible printed circuit (FPC) 418 that affixes to the elongate housing. FPC 418 may be communicatively coupled with haptic motor coil 206, and thus may be configured to control when haptic magnet 106 is driven to provide haptic feedback. FPC 418 may include or work in tandem with any suitable computer logic componentry, and may be configured to cause haptic feedback at any suitable time and in response to any suitable stimulus.

As described above, an electric current passing through haptic motor coil 206 may produce a magnetic force that moves haptic magnet 106. In some cases, this magnetic force may be enhanced by the presence of suitable enhancement magnets 420A and 420B that are statically mounted within the elongate housing on first and second respective lateral sides of the haptic motor coil. Specifically, the enhancement magnets may serve to redirect a magnetic flux provided by the haptic magnet in a manner that allows for greater haptic feedback intensity, as compared to an alternative implementation in which the enhancement magnets are omitted. As discussed above, however, the specific configuration of components described herein and illustrated in FIGS. 2-5 is one non-limiting example, and an active stylus as described herein need not include enhancement magnets.

Turning now to FIG. 5, another cross-sectional view of active stylus 100 is provided, this time sectioned parallel to the YZ plane. In this view, elongate housing 200 has a substantially oval-shaped cross section. It will be understood, however, that this is a non-limiting example. In other implementations, the elongate housing may have a circular profile, a square-shaped profile, a rectangular profile, or any other regular polygon or irregular shape.

In FIG. 5, portions of haptic magnet 106, first spring 210, haptic motor coil 206, and first and second enhancement magnets 420A and 420B are each visible. Furthermore, the positions of first supporting arm 300A, second supporting arm 300B, and supporting shelf 302 of spring 210 are shown relative to other components of the active stylus. As shown, a plane 500 of the two supporting arms intersects the haptic magnet. Furthermore, the inward surface of the supporting shelf is offset from the plane of the two supporting arms—in this example, the supporting shelf is lower than the plane of the two supporting arms relative to the Y axis.

FIG. 5 also includes a magnet polarity indicator 502 for haptic magnet 106, indicating a direction of the north pole of the haptic magnet. Similar polarity indicators 504A and 504B are also provided for first and second enhancement magnets 420A and 420B. It will be understood, however, that the specific arrangement of magnets depicted in FIG. 5 and the other FIGS. described herein is non-limiting. In other suitable arrangements, magnet polarities may have other suitable orientations while still enabling a haptic magnet to be driven and thereby produce haptic feedback.

In an example, an active stylus comprises: an elongate housing having a tip end and a secondary end, opposite the tip end; an inductive charging coil statically mounted within the elongate housing, between the tip end and the secondary end; a haptic motor coil statically mounted within the elongate housing, between the tip end and the inductive charging coil; and a haptic magnet moveably mounted within the elongate housing, the haptic magnet configured to be driven by the haptic motor coil to provide haptic feedback, and to magnetically hold the inductive charging coil in a charging position and orientation relative to an inductive charger. In this example or any other example, the active stylus further comprises a second magnet statically mounted within the elongate housing between the secondary end and the inductive charging coil, the second magnet cooperating with the haptic magnet to magnetically hold the inductive charging coil in the charging position and orientation relative to the inductive charger. In this example or any other example, the haptic magnet is spring mounted within the elongate housing by a first spring affixed to the haptic magnet and the elongate housing, the first spring enabling movement of the haptic magnet relative to the elongate housing. In this example or any other example, the first spring includes two supporting arms extending substantially parallel to a longitudinal axis of the elongate housing on first and second lateral sides of the haptic magnet. In this example or any other example, the first spring includes a supporting shelf extending between the two supporting arms at a tip-proximal end of the first spring, and an inward surface of the supporting shelf is affixed to a shelf-attachment surface of the haptic magnet. In this example or any other example, a plane of the two supporting arms intersects the haptic magnet, and the inward surface of the supporting shelf is offset from the plane of the two supporting arms. In this example or any other example, the active stylus further comprises a dampening material affixed to an outward surface of the supporting shelf. In this example or any other example, the first spring includes a mount at which the first spring is affixed to the elongate housing between the haptic magnet and the inductive charging coil, and the mount is disposed along a mounting beam of the first spring that extends away from the two supporting arms toward the haptic magnet at a tip-distal end of the first spring. In this example or any other example, the first spring is affixed to the elongate housing via one or both of riveting and welding. In this example or any other example, the haptic magnet is further spring mounted to the elongate housing by a second spring affixed to the elongate housing and a tip-proximal end of the haptic magnet. In this example or any other example, the first and second springs enable movement of the haptic magnet relative to the elongate housing along a travel axis of the haptic magnet, and the first and second springs are configured to mitigate other movement of the haptic magnet. In this example or any other example, the first and second springs are further configured to mitigate rotation of the haptic magnet. In this example or any other example, the second spring includes a first attachment mount at which the second spring is affixed to the elongate housing, a second attachment mount at which the second spring is affixed to a portion of the first spring, and two flexion wings extending between the first and second attachment mounts, the two flexion wings respectively disposed on first and second lateral sides of the haptic magnet. In this example or any other example, one or both of the first and second springs are tapered to control a vibration frequency of the haptic magnet during haptic feedback. In this example or any other example, the active stylus further comprises first and second enhancement magnets statically mounted within the elongate housing on first and second respective lateral sides of the haptic motor coil. In this example or any other example, the elongate housing defines a window that enables travel of at least a portion of the haptic magnet outside the elongate housing during haptic feedback.

In an example, an active stylus comprises: an elongate housing having a tip end and a secondary end, opposite the tip end; an inductive charging coil mounted within the elongate housing between the tip end and the secondary end; and a haptic magnet moveably mounted within the elongate housing between the tip end and the inductive charging coil, the haptic magnet configured to magnetically hold the inductive charging coil in a charging position and orientation relative to an inductive charger.

In an example, an active stylus comprises: an elongate housing having a tip end and a secondary end, opposite the tip end; an inductive charging coil mounted within the elongate housing between the tip end and the secondary end; a first magnet movably mounted within the elongate housing between the tip end and the inductive charging coil; and a second magnet statically mounted within the elongate housing between the secondary end and the inductive charging coil. In this example or any other example, the first magnet is a moving haptic magnet driven by a haptic motor coil. In this example or any other example, the first magnet and the second magnet are configured to cooperatively magnetically hold the inductive charging coil in a charging position and orientation relative to an inductive charger.

It will be understood that the configurations and/or approaches described herein are exemplary in nature, and that these specific embodiments or examples are not to be considered in a limiting sense, because numerous variations are possible.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An active stylus, comprising:
an elongate housing having a tip end and a secondary end, opposite the tip end;
an inductive charging coil mounted within the elongate housing, between the tip end and the secondary end;

a haptic motor coil mounted within the elongate housing, between the tip end and the inductive charging coil; and a haptic magnet moveably mounted within the elongate housing, the haptic magnet configured to be driven by the haptic motor coil to provide haptic feedback, and to magnetically hold the inductive charging coil in a charging position and orientation relative to an inductive charger.

2. The active stylus of claim 1, further comprising a second magnet statically mounted within the elongate housing between the secondary end and the inductive charging coil, the second magnet cooperating with the haptic magnet to magnetically hold the inductive charging coil in the charging position and orientation relative to the inductive charger.

3. The active stylus of claim 1, wherein the haptic magnet is spring mounted within the elongate housing by a first spring affixed to the haptic magnet and the elongate housing, the first spring enabling movement of the haptic magnet relative to the elongate housing.

4. The active stylus of claim 3, wherein the first spring includes two supporting arms extending substantially parallel to a longitudinal axis of the elongate housing on first and second lateral sides of the haptic magnet.

5. The active stylus of claim 4, wherein the first spring includes a supporting shelf extending between the two supporting arms at a tip-proximal end of the first spring, and wherein an inward surface of the supporting shelf is affixed to a shelf-attachment surface of the haptic magnet.

6. The active stylus of claim 5, wherein a plane of the two supporting arms intersects the haptic magnet, and wherein the inward surface of the supporting shelf is offset from the plane of the two supporting arms.

7. The active stylus of claim 5, further comprising a dampening material affixed to an outward surface of the supporting shelf.

8. The active stylus of claim 4, wherein the first spring includes a mount at which the first spring is affixed to the elongate housing between the haptic magnet and the inductive charging coil, and wherein the mount is disposed along a mounting beam of the first spring that extends away from the two supporting arms toward the haptic magnet at a tip-distal end of the first spring.

9. The active stylus of claim 8, wherein the first spring is affixed to the elongate housing via one or both of riveting and welding.

10. The active stylus of claim 3, wherein the haptic magnet is further spring mounted to the elongate housing by a second spring affixed to the elongate housing and a tip-proximal end of the haptic magnet.

11. The active stylus of claim 10, wherein the first and second springs enable movement of the haptic magnet relative to the elongate housing along a travel axis of the haptic magnet, and the first and second springs are configured to mitigate other movement of the haptic magnet.

12. The active stylus of claim 11, wherein the first and second springs are further configured to mitigate rotation of the haptic magnet.

13. The active stylus of claim 10, wherein the second spring includes a first attachment mount at which the second spring is affixed to the elongate housing, a second attachment mount at which the second spring is affixed to a portion of the first spring, and two flexion wings extending between the first and second attachment mounts, the two flexion wings respectively disposed on first and second lateral sides of the haptic magnet.

14. The active stylus of claim 10, wherein one or both of the first and second springs are tapered to control a vibration frequency of the haptic magnet during haptic feedback.

15. The active stylus of claim 1, further comprising first and second enhancement magnets statically mounted within the elongate housing on first and second respective lateral sides of the haptic motor coil.

16. The active stylus of claim 1, wherein the elongate housing defines a window that enables travel of at least a portion of the haptic magnet outside the elongate housing during haptic feedback.

17. An active stylus, comprising:
  an elongate housing having a tip end and a secondary end, opposite the tip end;
  an inductive charging coil mounted within the elongate housing between the tip end and the secondary end;
  a haptic motor coil mounted within the elongate housing, between the tip end and the inductive charging coil; and
  a haptic magnet moveably spring mounted within the elongate housing by a spring affixed to the haptic magnet and the elongate housing, the spring enabling movement of the haptic magnet relative to the elongate housing, the haptic magnet configured to be driven by the haptic motor coil to provide haptic feedback, the haptic magnet configured to magnetically hold the inductive charging coil in a charging position and orientation relative to an inductive charger.

* * * * *